(No Model.)
W. E. LUDLUM.
SPRING FOR LOCOMOTIVES.
No. 458,705. Patented Sept. 1, 1891.
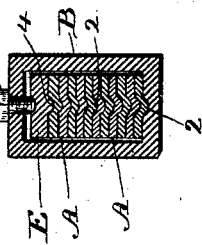
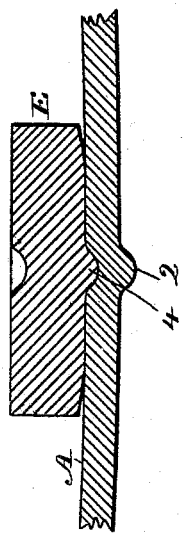
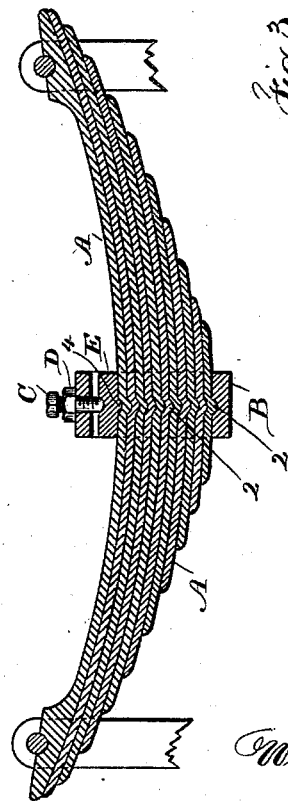
Witnesses
Chas H. Smith
J. Staib
Inventor
William E. Ludlum
Per Lemuel W. Serrell
atty.

UNITED STATES PATENT OFFICE.

WILLIAM E. LUDLUM, OF POMPTON, NEW JERSEY.

SPRING FOR LOCOMOTIVES.

SPECIFICATION forming part of Letters Patent No. 458,705, dated September 1, 1891.

Application filed January 29, 1891. Serial No. 379,488. (No model.)

*To all whom it may concern:*

Be it known that I, WILLIAM E. LUDLUM, a citizen of the United States, residing at Pompton, in the county of Passaic and State of New Jersey, have invented an Improvement in Springs for Locomotives, &c., of which the following is a specification.

In the manufacture of springs for locomotives and heavy vehicles it is usual to prepare the leaves composing the spring and to clamp them together, and to make a wrought-metal band and shrink the same around the center portion of the springs after they have been firmly clamped, so that such metal band as it cools and contracts binds together firmly the layers or leaves composing the spring, and in so doing the middle portions of the springs are rendered inert and its elasticity lessened, and the leaves are more liable to break. In this class of springs if one leaf breaks it is almost impossible to separate the parts of the spring for replacing the defective leaf without considerable expense and loss of time, as the bands are expensive and usually have to be cut off to separate the leaves of the spring.

Efforts have been made to keep the leaves of the spring in position by forging a recess in one surface of each leaf and a corresponding projection or teat upon the opposite surface of such leaf, and a screw has been made use of, passing through the top of the band into the recess of the top leaf. In this way of constructing the spring the top leaf is especially liable to be broken at the place where the screw enters the recess, because this portion of the spring is subjected to great strain and vibration and the point of the screw becomes a pivot or center of vibration.

The object of the present invention is to overcome the difficulties heretofore experienced in both modes of construction before referred to, and by my improvements I am enabled to separate the parts of the spring to remove any injured leaf or layer or hold the parts of the spring in position, and at the same time to allow freedom in the vibrations of the spring and to distribute the strain in such a manner as to prevent injury to any portion of the spring.

In the drawings, Figure 1 is a vertical section longitudinally of the spring, and Fig. 2 is a similar view transversely. Fig. 3 is a vertical longitudinal section, in larger size, of the bearing-plate and of a portion of the top leaf of the spring.

The leaves A of the spring are of any desired size, and they are usually reduced in thickness toward the ends and bent into an arc of a circle, and the leaves increase in length, as usual, and the longest leaf is provided with bearings or connections to the links or other suspending or supporting devices, and near the center of each leaf a recess is struck up and a corresponding projection or teat at the opposite side, as seen at 2.

The band B is of proper strength and sufficiently large to receive the leaves between the two sides of the band, and there is a recess in the bottom of the band for the teat or projection upon the bottom leaf of the spring, and a screw C passes through the top of the band and is preferably provided with a set-nut D.

I make use of a bearing-plate E, resting upon the top leaf of the spring between the same and the end of the screw C, and there is a recess for the end of the screw and a teat 4, passing into the recess at the middle of the top leaf of the spring, and this bearing-plate E is slightly rounded on its under face, adjacent to such top leaf of the spring, in order that the under surface of this bearing-plate may follow the curvature of the main plate and not press at the two edges only, as would be the case if straight. When the bearing-plate is set up by the spring, the leaves are clamped together and the pressure is distributed over a large surface, thus avoiding the danger of breakage arising when the pressure is applied directly by the screw, and the spring has great freedom of movement and its reliability is increased. In cases where the set-screw bears in the recess of the top leaf of the spring any break is liable to occur near the recess, and one of the broken parts is liable to come out and be caught in the machinery of the locomotive. This risk is lessened and nearly removed by the bearing-plate acting to confine the parts of the spring, as aforesaid. It is to be understood that the width of this bearing-plate is sufficient to fill the space between the sides of the strap or band, and that when the parts of the spring require to be separated the screw E can be slackened and the bearing-plate slipped out endwise, after which the leaves or plates of the spring can be taken apart for repairs or otherwise.

I claim as my invention—

The combination, with the band and the leaves or spring-plates within the band, of the screw passing through the band and the bearing-plate between the end of the screw and the upper leaf of the spring, the under surface that is against the spring being slightly rounding, substantially as set forth.

Signed by me this 8th day of January, 1891.

WILLIAM E. LUDLUM.

Witnesses:
I. W. McELROY,
RICHD. WRIGHT.